United States Patent
Fagenson

(10) Patent No.: US 11,892,310 B2
(45) Date of Patent: Feb. 6, 2024

(54) USER INTERFACE FOR AN ELECTRIC VEHICLE CHARGING STATION MOBILE APPLICATION

(71) Applicant: Volta Charging, LLC, San Francisco, CA (US)

(72) Inventor: Theodore Fagenson, San Ramon, CA (US)

(73) Assignee: Volta Charging, LLC, San Francisco, CA (US)

( * ) Notice: Subject to any disclaimer, the term of this patent is extended or adjusted under 35 U.S.C. 154(b) by 36 days.

(21) Appl. No.: 17/691,947

(22) Filed: Mar. 10, 2022

(65) Prior Publication Data
US 2022/0299330 A1 Sep. 22, 2022

Related U.S. Application Data

(63) Continuation of application No. PCT/US2022/019461, filed on Mar. 9, 2022.

(60) Provisional application No. 63/161,731, filed on Mar. 16, 2021.

(51) Int. Cl.
*G01C 21/34* (2006.01)
*G06Q 30/0207* (2023.01)
*B60L 53/66* (2019.01)

(52) U.S. Cl.
CPC .......... *G01C 21/3476* (2013.01); *B60L 53/66* (2019.02); *G06Q 30/0237* (2013.01)

(58) Field of Classification Search
CPC ............ G01C 21/3679; G01C 21/3667; G01C 21/3469; B60L 58/12
See application file for complete search history.

(56) References Cited

U.S. PATENT DOCUMENTS

| | | | |
|---|---|---|---|
| 11,132,715 B2* | 9/2021 | Menendez | G06Q 30/0269 |
| 11,180,041 B2* | 11/2021 | Nishida | B60L 53/67 |
| 2012/0123670 A1 | 5/2012 | Uyeki | |
| 2012/0296678 A1* | 11/2012 | Boot | G06Q 10/02 |
| | | | 705/5 |
| 2013/0339072 A1 | 12/2013 | Touge | |

(Continued)

FOREIGN PATENT DOCUMENTS

KR 20120099977 A 9/2012

OTHER PUBLICATIONS

Volta Charging, LLC, International Search Report and Written Opinion, PCT/US2022/019461, dated Jul. 14, 2022, 15 pgs.

*Primary Examiner* — John Kwon
(74) *Attorney, Agent, or Firm* — Morgan, Lewis & Bockius LLP

(57) ABSTRACT

A method is performed at an electronic device with a display. The method includes receiving a request from a user to display information about electric vehicle charging stations near a geographic location. The method further includes, in response to the request to display information about electric vehicle charging stations near the geographic location, for a respective charging station near the geographic location: identifying a commercial enterprise co-located with the respective electric vehicle charging station, and displaying, on the display, an indication of the respective electric vehicle charging station. The indication of the respective electric vehicle charging station includes a representation of the co-located commercial enterprise.

23 Claims, 16 Drawing Sheets

(56) References Cited

U.S. PATENT DOCUMENTS

| | | | | |
|---|---|---|---|---|
| 2014/0214321 A1* | 7/2014 | Kawamata | ......... | G01C 21/3476 340/901 |
| 2014/0358749 A1* | 12/2014 | Williams | ............... | G06Q 30/04 705/34 |
| 2021/0394632 A1* | 12/2021 | McCool | ................ | B60L 53/305 |
| 2021/0404838 A1* | 12/2021 | Naito | ...................... | B60L 53/60 |

\* cited by examiner (B)

```
Transmit (728) instructions, to the client device, to display an indication
of the respective electric vehicle charging station, wherein the indication
of the respective electric vehicle charging station includes a
representation of the retail outlet co-located with the respective electric
vehicle charging station
```

> The indication is (730) displayed as an overlay on a map

> The indication of the respective electric vehicle charging station represents (732) a group of electric vehicle charging stations that are co-located with the retail outlet > The representation of the retail outlet co-located with the respective electric vehicle charging station is (734) a logo for the retail outlet Receive (736), from the client device, user selection of the indication of the respective electric vehicle charging station that includes the representation of the retail outlet co-located with the respective electric vehicle charging station In response to receiving the user selection of the indication of the respective electric vehicle charging station, display (738) a summary of the respective electric vehicle charging station > The summary includes (740) a promotional offer for the retail outlet > The promotional offer includes (742) extended electric vehicle charging > The summary includes (744) an indication of availability of the respective electric vehicle charging station

FIG. 7C

USER INTERFACE FOR AN ELECTRIC VEHICLE CHARGING STATION MOBILE APPLICATION

PRIORITY APPLICATION

This application is a continuation of PCT/US2022/019461, filed Mar. 9, 2022, which claims priority to U.S. Prov. App. No. 63/161,731, filed Mar. 16, 2021, each of which is hereby incorporated by reference in its entirety.

TECHNICAL FIELD

This application relates generally to user interfaces for electric vehicle charging station mobile applications, and more particularly, to user interfaces that display representations of commercial enterprises that are near electric vehicle charging stations.

BACKGROUND

Electric vehicles are growing in popularity, largely due to their reduced environmental impact and lack of reliance on fossil fuels. These vehicles, however, typically need to be charged more frequently than a gas-powered vehicle would need to be refueled (e.g., every 100 miles as opposed to every 400 miles). As such, the availability of electric vehicle charging stations plays a significant roll in users' decisions about where to travel.

Conventional methods and user interfaces within electric vehicle charging station mobile applications include very little information about what is near a respective electric vehicle charging station (EVCS). For example, a user looking to charge their vehicle while grocery shopping typically must search for grocery stores (e.g., in a maps application) and then separately search for nearby charging stations (e.g., in the EVCS mobile application), while remembering where the desired grocery store was located. Not only is this process frustrating for the user, but also leads to an inefficient human-machine interface, as the excess browsing on the user's device reduces its battery power. In addition, this conventional process is error-prone, as a user is very likely to miss the fact that a charging station is co-located with a desirable commercial enterprise. This results in increased mileage and wear and tear on the electric vehicle as the user is forced to go out of their way to charge.

SUMMARY

The disclosed implementations provide systems (e.g., server systems and client devices) and methods of providing user interfaces in EVCS mobile applications that display information about commercial enterprises that are co-located with electric vehicle charging stations. Displaying information about commercial enterprises co-located with charging stations obviates the need for the user to search for commercial enterprises independently of searching for charging stations (e.g., in a separate maps application). Doing so not only saves time and provides convenience to the user, but also results in a more efficient machine-human interface. That is, displaying a representation of commercial enterprises co-located with charging stations reduces the number of inputs needed by the user to determine where to go and where to charge, which saves battery power for the electronic device and reduces the mileage driven by the electric vehicle (e.g., by directing the user to charging stations that happen to be located where the user needs to go anyway). The latter effect saves battery power and reduces wear and tear on electric vehicles and has the general effect of being environmentally friendly by reducing the number of miles driven.

To that end, in accordance with some implementations, a method is performed at a server system with one or more processors and memory. The method includes receiving, from a client device, a request for information about electric vehicle charging stations near a geographic location. The method further includes identifying a respective electric vehicle charging station near the geographic location. The method further includes identifying a commercial enterprise co-located with the respective electric vehicle charging station. The method further includes transmitting instructions, to the client device, to display an indication of the respective electric vehicle charging station, wherein the indication of the respective electric vehicle charging station includes a representation of the commercial enterprise co-located with the respective electric vehicle charging station.

In some embodiments, a method is performed at an electronic device with a display. The method includes receiving a request from a user to display information about electric vehicle charging stations near a geographic location. The method further includes, in response to the request to display information about electric vehicle charging stations near the geographic location, for a respective charging station near the geographic location: identifying a commercial enterprise co-located with the respective electric vehicle charging station, and displaying, on the display, an indication of the respective electric vehicle charging station. The indication of the respective electric vehicle charging station includes a representation of the co-located commercial enterprise.

In some embodiments, a method is performed at an electronic device with a display. The method includes displaying a map of electric vehicle charging stations, including a plurality of electric vehicle charging stations that are each associated with a commercial enterprise. The method further includes receiving a request from a user to filter the plurality of electric vehicle charging stations according to user-selected commercial enterprise criteria. The method further includes, in response to the request: determining a subset, less than all, of the electric vehicle charging stations that satisfy the user-selected commercial enterprise criteria; and updating the map of electric vehicle charging stations to show the subset of the plurality of electric vehicle charging stations that meet the user-selected commercial enterprise criteria.

Some implementations of the present disclosure provide a computer system (e.g., a server system), comprising one or more processors and memory storing one or more programs. The one or more programs store instructions that, when executed by the one or more processors, cause the computer system to perform any of the methods described herein.

Some implementations of the present disclosure provide a computer program product (e.g., a non-transitory computer readable storage medium storing instructions) that, when executed by a computer system having one or more processors, cause the computer system to perform any of the methods described herein.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

FIGS. 7A-7C illustrate a flowchart of a method of providing indications of available electric vehicle charging stations with pertinent information about nearby retail outlets, in accordance with some implementations.

DETAILED DESCRIPTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Many modifications and variations of this disclosure can be made without departing from its spirit and scope, as will be apparent to those skilled in the art. The specific implementations described herein are offered by way of example only, and the disclosure is to be limited only by the terms of the appended claims, along with the full scope of equivalents to which such claims are entitled.

The disclosed implementations provide systems and methods of providing user interfaces in EVCS mobile applications that display information about commercial enterprises (e.g., having physical locations) that are co-located with electric vehicle charging stations. The remainder of this disclosure provides examples in which the commercial enterprises are retail outlets. One of skill in the art having the benefit of this disclosure, however, will recognize that the systems and methods described herein are equally applicable to other types of commercial enterprises (e.g., entities of commerce, points of commerce, facilities of commerce). For example, in some embodiments, the systems and methods described herein may be used to provide a user with information about ice skating rinks, ski resorts, non-profit centers (e.g., museums), and others. In some embodiments, the systems and methods described herein may be applied to points of interest (POIs) that are not commercial in nature.

Figure 1:
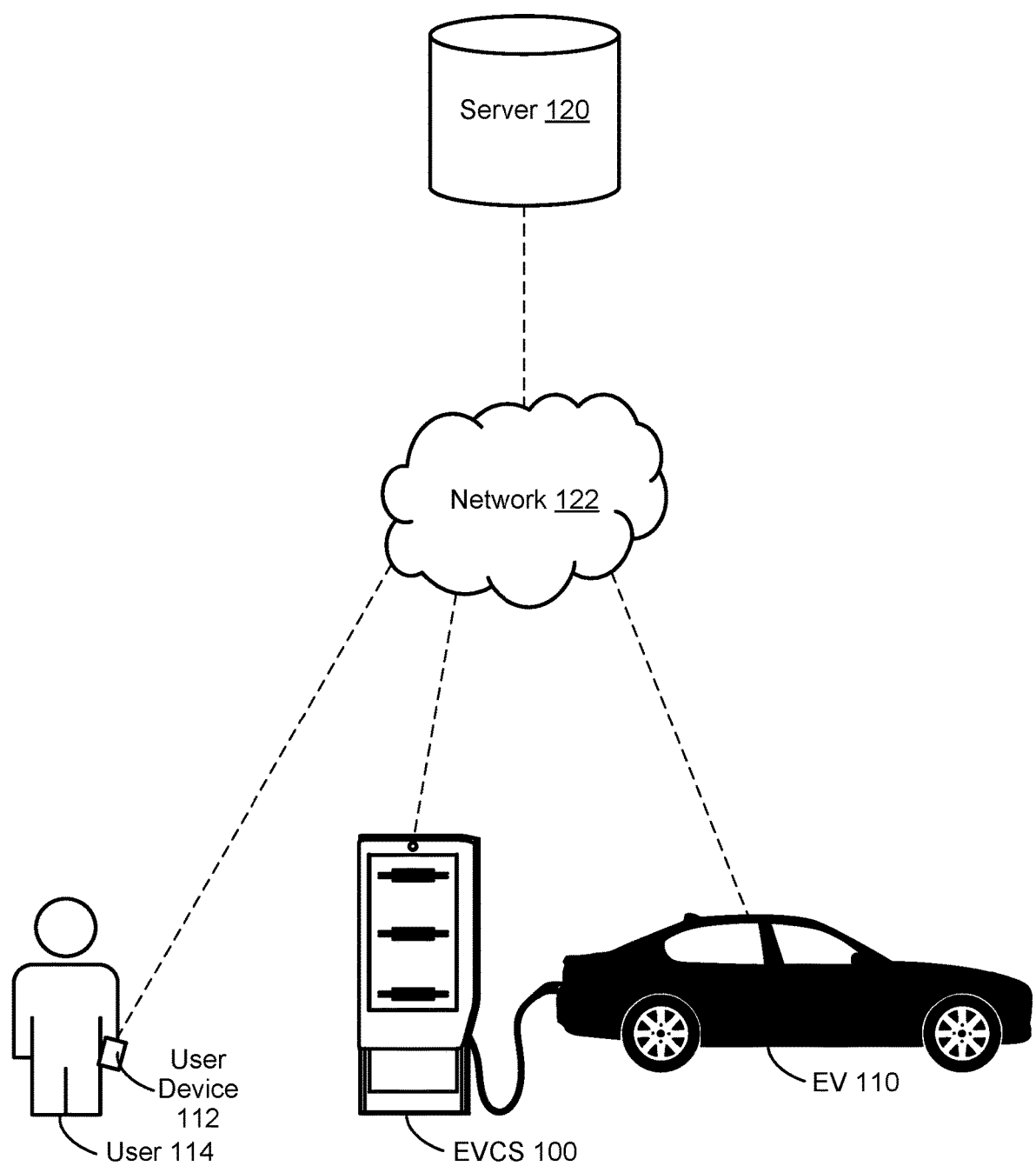
FIG. 1 illustrates a system for charging an electric vehicle in accordance with some implementations.

FIG. 1 illustrates an electric vehicle charging station (EVCS) 100 that is configured to provide an electric charge to an electric vehicle 110 via one or more electrical connections. In some implementations, the EVCS 100 provides an electric charge to electric vehicle 110 via a wired connection, such as a charging cable. Alternatively, the EVCS 100 may provide an electric charge to electric vehicle 110 via a wireless connection (e.g., wireless charging). In some implementations, the EVCS 100 may be in communication with the electric vehicle 110 or a user device 112 belonging to a user 114 (e.g., a driver, passenger, owner, renter, or other operator of the electric vehicle 110) that is associated with the electric vehicle 110. In some implementations, the EVCS 100 communicates with one or more devices or computer systems, such as user device 112 or server 120, respectively, via a network 122.

Figure 2A:
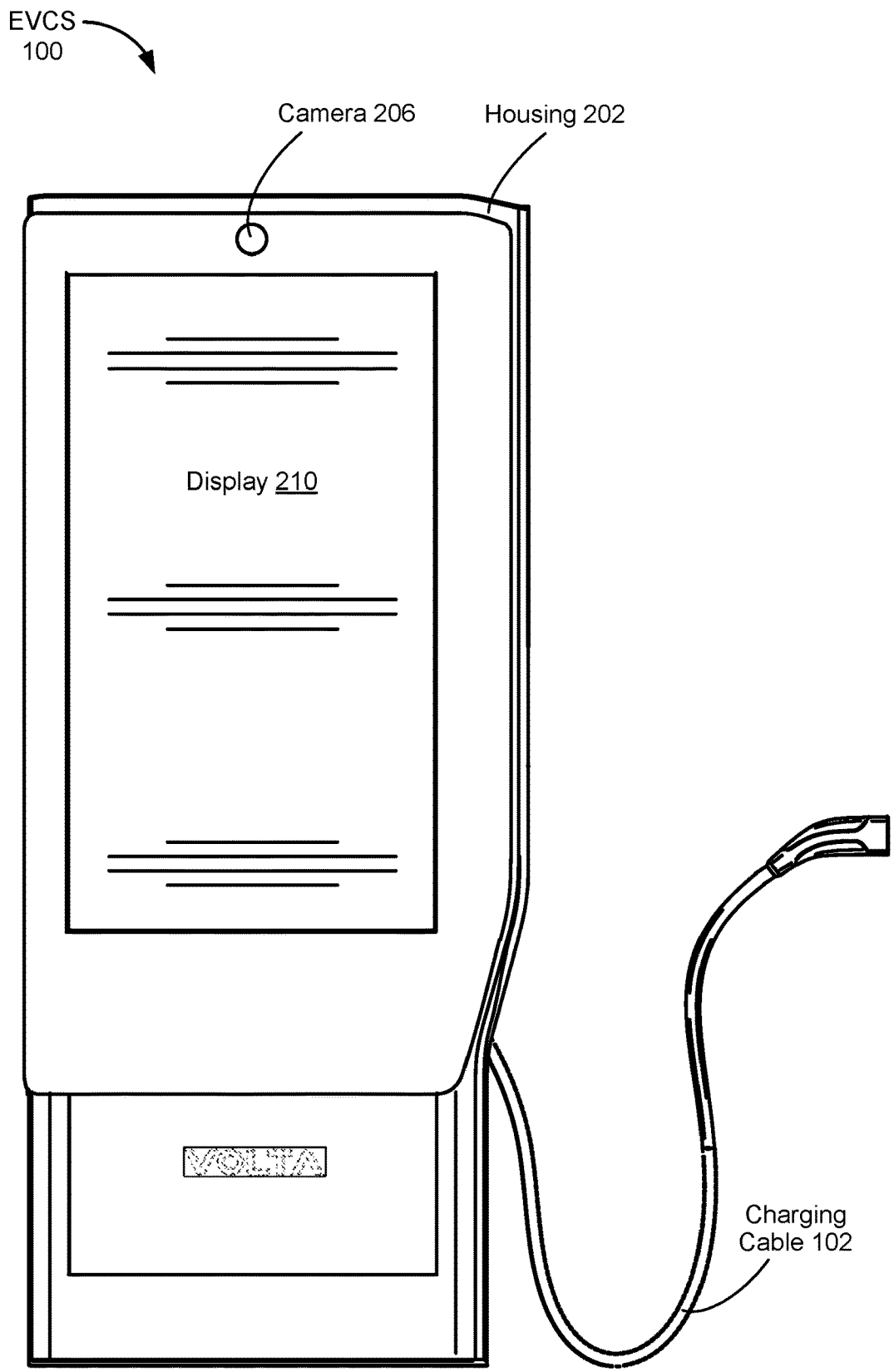
FIGS. 2A-2C illustrate a charging station for an electric vehicle in accordance with some implementations.
Figure 2B:
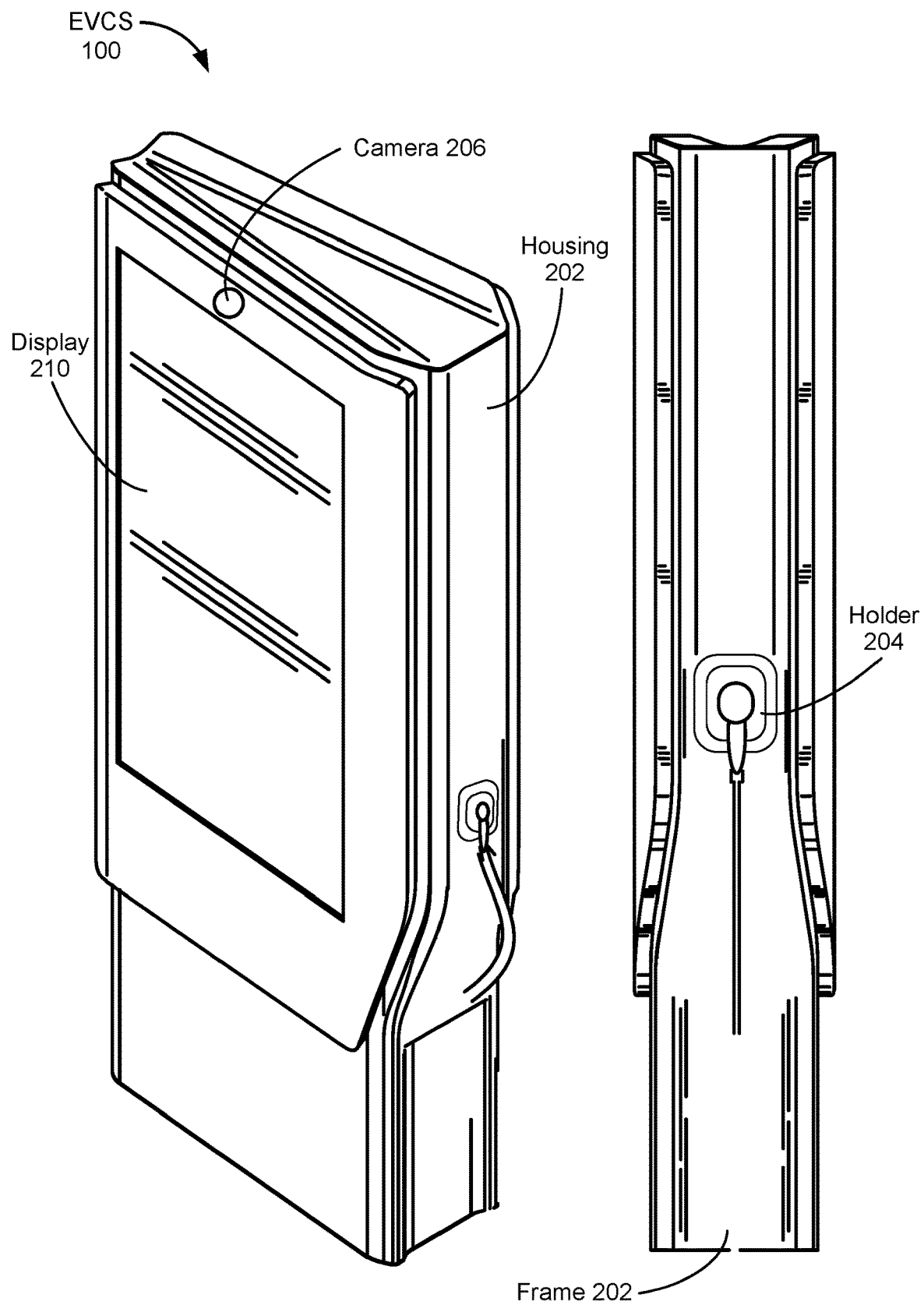
Figure 2C:
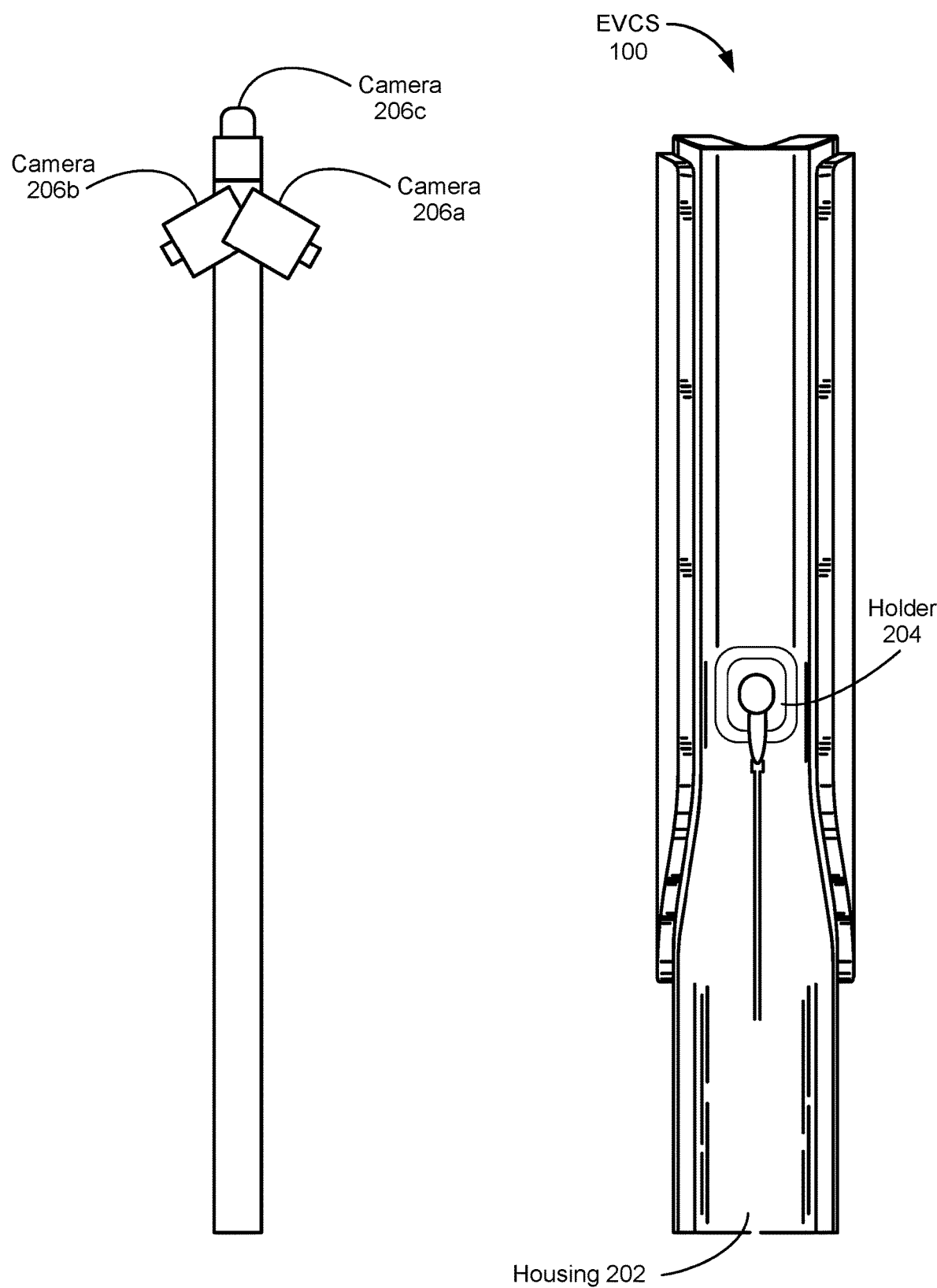

FIG. 2A is a mechanical drawing showing various views of an electric vehicle charging station (EVCS) 100, in accordance with some implementations. FIG. 2B is a mechanical drawing showing additional views of the EVCS 100 of FIG. 2A, in accordance with some implementations. FIG. 2C shows an alternative configuration of EVCS 100, in accordance with some implementations. FIGS. 2A-2C are discussed together below.

EVCS 100 includes a housing 202 (e.g., a body or a chassis) including a charging cable 102 (e.g., connector) configured to connect and provide a charge to an electric vehicle 110 (FIG. 1). An example of a suitable connector is an IEC 62196 type-2 connector. In some implementations, the connector is a "gun-type" connector (e.g., a charge gun) that, when not in use, sits in a holder 204 (e.g., a holster). In some implementations, the housing 202 houses circuitry for charging an electric vehicle 110. For example, in some implementations, the housing 202 includes power supply circuitry as well as circuitry for determining a state of a vehicle being charged (e.g., whether the vehicle is connected via the connector, whether the vehicle is charging, whether the vehicle is done charging, etc.).

The EVCS 100 further includes one or more displays 210 facing outwardly from a surface of the EVCS 100. For example, the EVCS 100 may include two displays 210, one on each side of the EVCS 100, each display 210 facing outwardly from the EVCS 100. In some implementations, the one or more displays 210 display messages (e.g., media content) to users of the charging station (e.g., operators of the electric vehicle) and/or to passersby that are in proximity to the EVCS 100. In some implementations, the panel 106a (and/or panel 106b) has a height that is at least 60% of a height of the housing 202 and a width that is at least 90% of a width of the housing 202. In some implementations, the panel 102 has a height that is at least 3 feet and a width that is at least 2 feet.

In some implementations, the EVCS 100 includes one or more panels that hold a display 210. The displays are large compared to the housing 202 (e.g., 60% or more of the height of the frame and 80% or more of the width of the frame), allowing the displays 210 to function as billboards, capable of conveying information to passersby. In some implementations, the displays 210 are incorporated into articulating panels that articulate away from the housing 202 (e.g., a sub-frame). The articulating panels solve the technical problem of the need for maintenance of the displays 210 (as well as one or more computers that control content displayed on the display). To that end, the articulating panels provide easy access to the entire back of the displays 210. In addition, in some implementations, the remaining space between the articulating panels (e.g., within the housing 202) is hollow, allowing for ample airflow and cooling of the displays 210.

The EVCS 100 further includes a computer that includes one or more processors and memory. The memory stores instructions for displaying content on the display 210. In some implementations, the computer is disposed inside the housing 202. In some implementations, the computer is mounted on a panel that connects (e.g., mounts) a first display (e.g., a display 210) to the housing 202. In some implementations, the computer includes a near-field communication (NFC) system that is configured to interact with a user's device (e.g., user device 112 of a user 114 of the EVCS 100).

In some implementations, the EVCS 100 includes one or more sensors (not shown) for detecting whether external objects are within a predefined region (area) proximal to the housing. For example, the area proximal to the EVCS 100 includes one or more parking spaces, where an electric vehicle 110 parks in order to use the EVCS 100. In some implementations, the area proximal to the EVCS 100 includes walking paths (e.g., sidewalks) next to the EVCS 100. In some implementations, the one or more sensors are configured to determine a state of the area proximal to the EVCS 100 (e.g., wherein determining the state includes detecting external objects). The external objects can be living or nonliving, such as people, kids, animals, vehicles, shopping carts, (kids) toys, etc. The one or more sensors can detect stationary or moving external objects. The one or more sensors of the EVCS 100 include one or more image (e.g., optical) sensors (e.g., one or more cameras 206), ultrasound sensors, depth sensors, IR/RGB cameras, PIR, heat IR, proximity sensors, radar, and/or tension sensors. The one or more sensors may be connected to the EVCS 100 or a computer system associated with the EVCS 100 via wired or wireless connections such as via a Wi-Fi connection or Bluetooth connection.

In some implementations, the housing 202 includes one or more lights configured to provide predetermined illumination patterns indicating a status of the EVCS 100. In some implementations, at least one of the one or more lights is configured to illuminate an area proximal to the EVCS 100 as a person approaches the area (e.g., a driver returning to a vehicle or a passenger exiting a vehicle that is parked in a parking spot associated with the EVCS 100).

In some implementations, the housing 202 includes one or more cameras 206 configured to capture one or more images of an area proximal to the EVCS 100. In some implementations, the one or more cameras 206 are configured to obtain video of an area proximal to the EVCS 100. For example, a camera may be configured to obtain a video or capture images of an area corresponding to a parking spot associated with the EVCS 100. In another example, another camera may be configured to obtain a video or capture images of an area corresponding to a parking spot next to the parking spot of the EVCS 100. In a third example, the camera 206 may be a wide angle camera or a 360° camera that is configured to obtain a video or capture images of a large area proximal to the EVCS 100, including a parking spot of the EVCS 100. As shown in FIG. 2B, the one or more cameras 206 may be mounted directly on a housing 202 of the EVCS 100 and may have a physical (e.g., electrical, wired) connection to the EVCS 100 or a computer system associated with the EVCS 100. Alternatively, as shown in FIG. 2C, the one or more cameras 206 (or other sensors) may be disposed separately from but proximal to the housing 202 of the EVCS 100. In some implementations, the camera 206 may be positioned at different locations on the EVCS 100 than what is shown in the figures. Further, in some implementations, the one or more cameras 206 include a plurality of cameras positioned at different locations on the EVCS 100.

Figure 3:
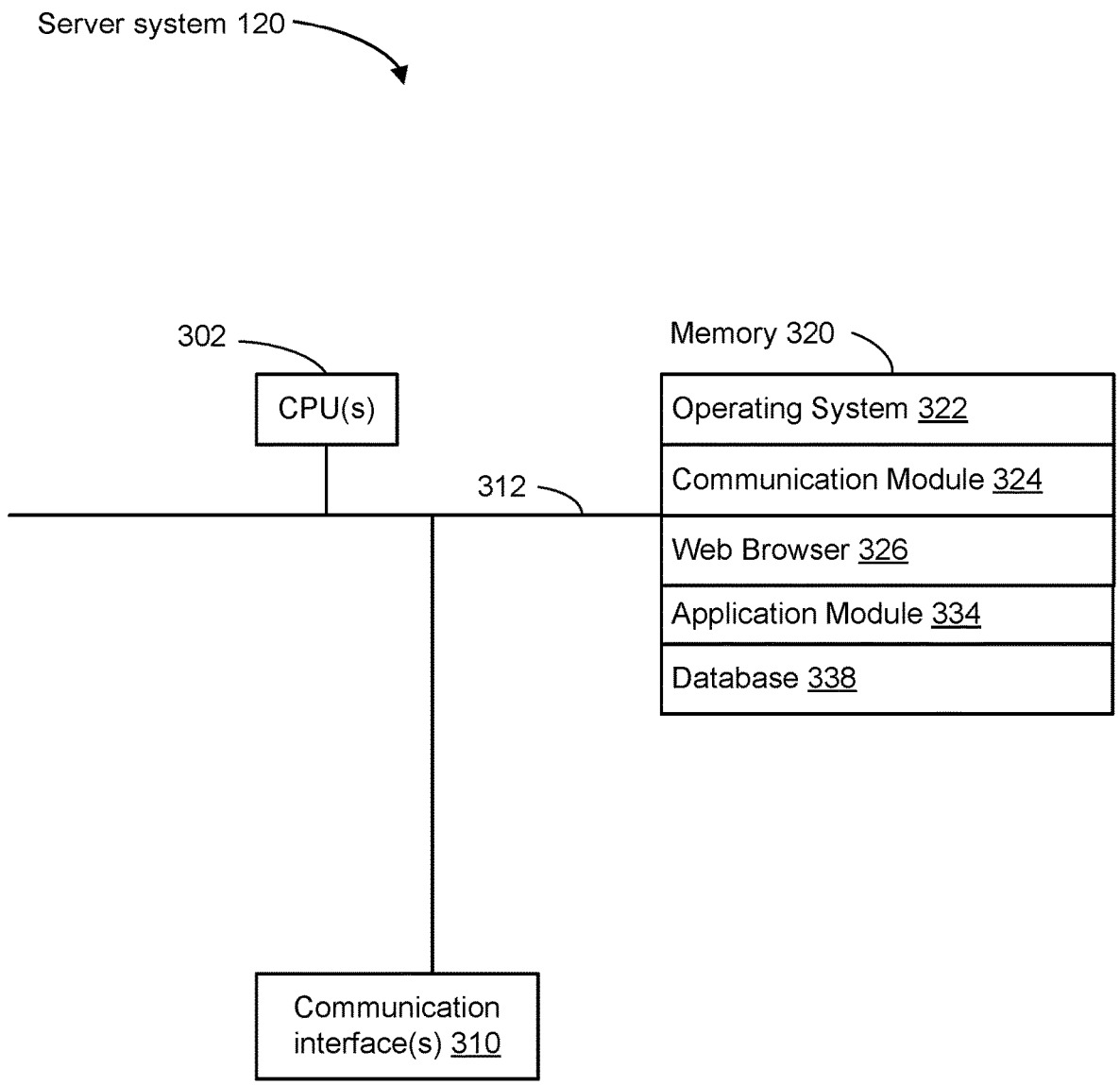
FIG. 3 is a block diagram of a server system in accordance with some implementations.

FIG. 3 is a block diagram of a server system 120, in accordance with some implementations. Server system 120 may include one or more computer systems (e.g., computing devices), such as a desktop computer, a laptop computer, and a tablet computer. In some implementations, the server system 120 is a data server that hosts one or more databases (e.g., databases of images or videos), models, or modules or may provide various executable applications or modules. The server system 120 includes one or more processing units (processors or cores, CPU(s)) 302, one or more network or other communications network interfaces 310, memory 320, and one or more communication buses 312 for interconnecting these components. The communication buses 312 optionally include circuitry (sometimes called a chipset) that interconnects and controls communications between system components.

The memory 320 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. In some implementations, the memory 320 includes one or more storage devices remotely located from the processors 302. The memory 320, or alternatively the non-volatile memory devices within the memory 320, includes a non-transitory computer-readable storage medium. In some implementations, the memory 320 or the computer-readable storage medium of the memory 320 stores the following programs, modules, and data structures, or a subset or superset thereof:

- an operating system 322, which includes procedures for handling various basic system services and for performing hardware dependent tasks;
- a communications module 324, which is used for connecting the server system 120 to other computers and devices via the one or more communication network interfaces 310 (wired or wireless), such as the internet, other wide area networks, local area networks, metropolitan area networks, and so on;
- a web browser 326 (or other application capable of displaying web pages), which enables a user to communicate over a network with remote computers or devices;
- an application module 334 for providing services to EVCS mobile application 538 (FIG. 5), including responding to requests for available charging stations, identifying (e.g., in database 338) retail outlets that are co-located with electric vehicle charging stations, transmitting instructions to EVCS mobile application 538 to display indications of available charging stations, together with representations of the co-located retail outlets, and so forth;
- database 338 for storing information on electric vehicle charging stations, their availability, retail outlets that are co-located with said electric vehicle charging stations, and so forth.

Each of the above identified executable modules, applications, or sets of procedures may be stored in one or more of the previously mentioned memory devices and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 320 stores a subset of the modules and data structures identified above. Furthermore, the memory 320 may store additional modules or data structures not described above.

Although FIG. 3 shows a server system 120, FIG. 3 is intended more as a functional description of the various features that may be present rather than as a structural schematic of the implementations described herein. In practice, and as recognized by those of ordinary skill in the art, items shown separately could be combined and some items could be separated.

Figure 4:
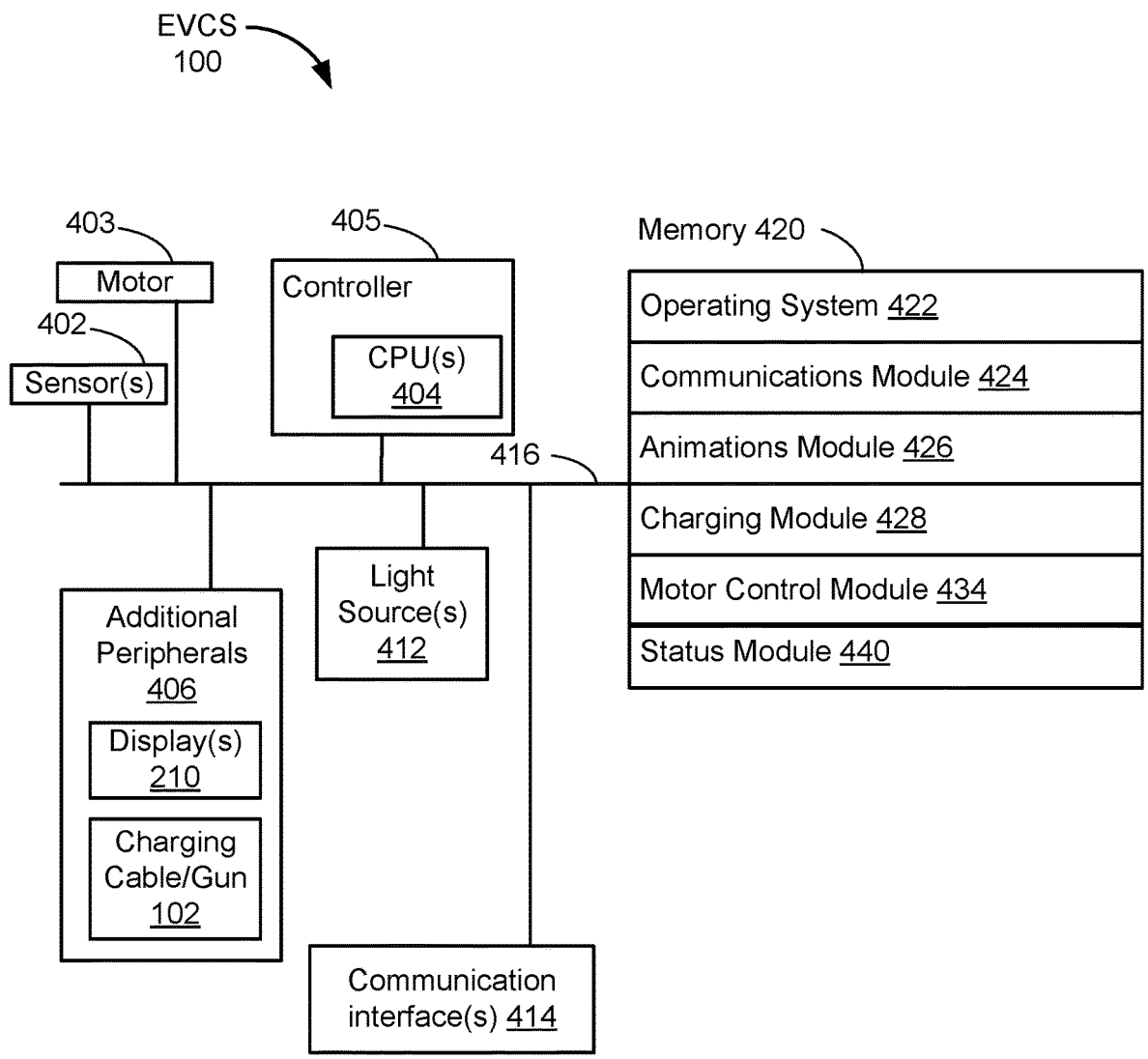
FIG. 4 is a block diagram of a charging station for an electric vehicle in accordance with some implementations.

FIG. 4 is a block diagram of an EVCS 100 (FIGS. 1 and 2A-2C) for charging an electric vehicle, in accordance with some implementations. The EVCS 100 optionally includes a motor 403 (configured to retract a portion of a charging cable), a controller 405 that includes one or more processing units (processors or cores) 404, one or more network or other communications network interfaces 414, memory 420, one or more light sources 412, one or more sensors 402, additional peripherals 406, and one or more communication buses 416 for interconnecting these components. The communication buses 416 optionally include circuitry (sometimes called a chipset) that interconnects and controls communications between system components. In some implementations, the memory 420 stores instructions for performing (by the one or more processing units 404) a set of operations, including determining a status of the EVCS 100, wherein the status indicates a state of an electric vehicle 110 at the charging station.

EVCS 100 typically includes additional peripherals 406 such as displays 210 for displaying content, and charging cable 102. In some implementations, the displays 210 may be touch-sensitive displays that are configured to detect various swipe gestures (e.g., continuous gestures in vertical and/or horizontal directions) and/or other gestures (e.g., a single or double tap) or to detect user input via a soft keyboard that is displayed when keyboard entry is needed.

The user interface may also include one or more sensors 402 such as cameras (e.g., camera 206, described above with respect to FIGS. 2A-2B), ultrasound sensors, depth sensors, infrared cameras, visible (e.g., RGB or black and white) cameras, passive infrared sensors, heat detectors, infrared sensors, proximity sensors, or radar. In some implementations, the one or more sensors 402 are for detecting whether external objects are within a predefined region proximal to the housing, such as living and nonliving objects, and/or the status of the EVCS 100 (e.g., available, occupied, etc.) in order to perform an operation, such as retracting the charging cable safely and carefully.

The memory 420 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. In some implementations, the memory 420 includes one or more storage devices remotely located from the processors 404, such as database 338 of server system 120 that is in communication with the EVCS 100. The memory 420, or alternatively the non-volatile memory devices within the memory 420, includes a non-transitory computer-readable storage medium. In some implementations, the memory 420 or the computer-readable storage medium of the memory 420 stores the following programs, modules, and data structures, or a subset or superset thereof:

- an operating system 422, which includes procedures for handling various basic system services and for performing hardware dependent tasks;
- a communications module 424, which is used for connecting the EVCS 100 to other computers and devices via the one or more communication network interfaces 414 (wired or wireless), such as the internet, other wide area networks, local area networks, metropolitan area networks, and so on;
- an animations module 426 for animating the one or more light sources 412 to provide predetermined illumination patterns or to provide illumination for passersby and users of the EVCS 100;
- a charging module 428 for charging an electric vehicle (e.g., measuring how much charge has been delivered to an electric vehicle, commencing charging, ceasing charging, etc.);
- motor control module 434 that includes one or more instructions for energizing or forgoing energizing the motor; and
- a status module 440 for monitoring a charging status of the EVCS 100 (e.g., a status of the EVCS 100 with respect to charging of an electric vehicle or its ability/inability to charge an electric vehicle).

In some implementations, the memory 420 stores metrics, thresholds, and other criteria, which are compared against the measurements captured by the one or more sensors 402. For example, data obtained from a PIR sensor of the one or more sensors 402 can be compared with baseline data to detect that an object is in proximity the EVCS 100.

Each of the above identified executable modules, applications, or sets of procedures may be stored in one or more of the previously mentioned memory devices and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 420 stores a subset of the modules and data structures identified above. Furthermore, the memory 420 may store additional modules or data structures not described above.

Although FIG. 4 shows an EVCS 100, FIG. 4 is intended more as a functional description of the various features that may be present rather than as a structural schematic of the implementations described herein. In practice, and as recognized by those of ordinary skill in the art, items shown separately could be combined and some items could be separated.

Figure 5:
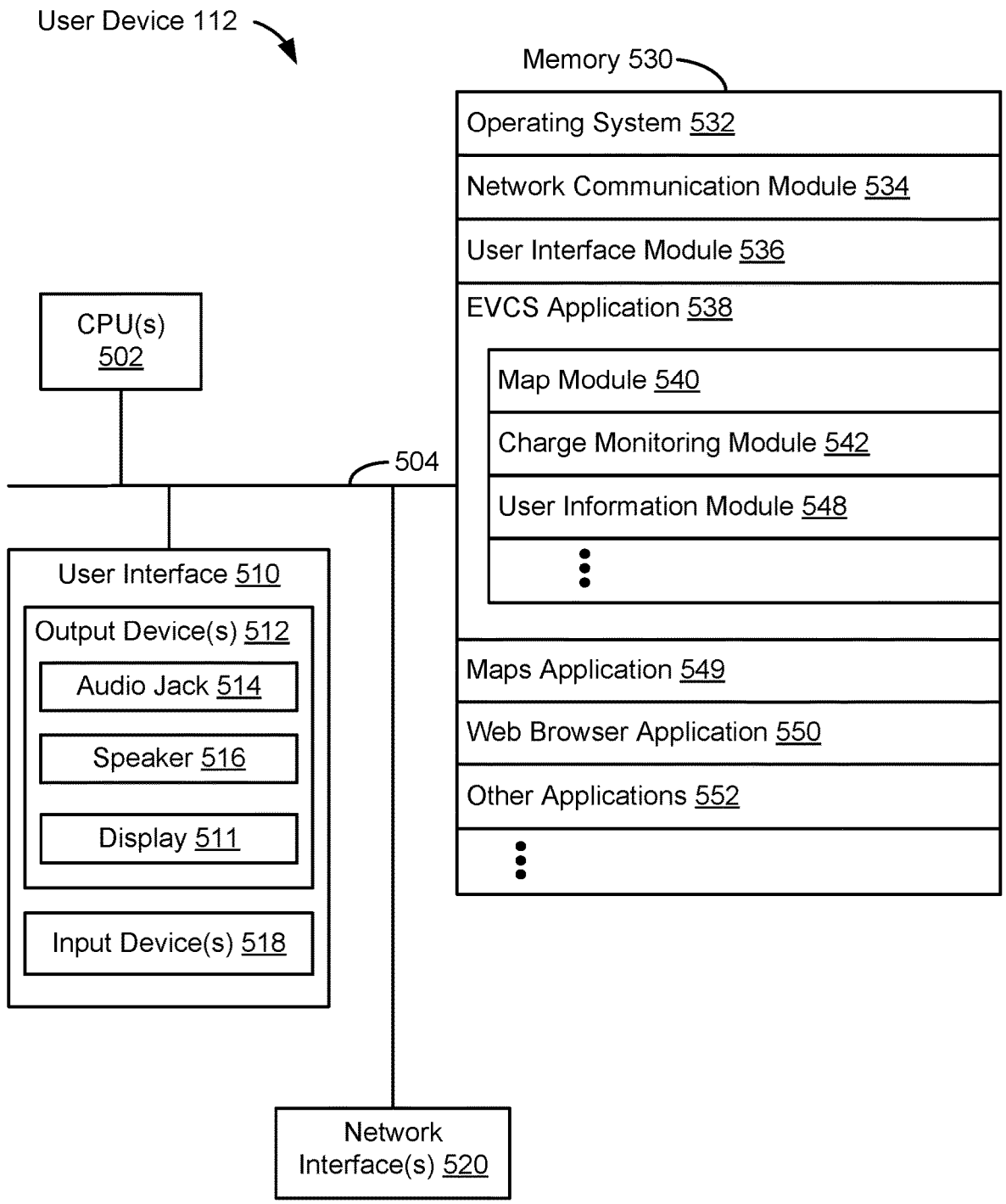
FIG. 5 is a block diagram of a user device in accordance with some implementations.

FIG. 5 is a block diagram of a user device 112 of a user 114 in accordance with some implementations. In some implementations, the user 114 is associated with (e.g., an operator of) an electric vehicle 110 at EVCS 100. Various examples of the computing device 112 include a cellular-capable smart device such as a smartphone, a smart watch, a laptop computer, a tablet computer, and other computing devices that have a processor capable of connecting to the EVCS 100 via a communications network (e.g., network 122).

The user device 112 typically includes one or more processing units (processors or cores) 502, one or more network or other communications network interfaces 520, memory 530, and one or more communication buses 504 for interconnecting these components. The communication buses 504 optionally include circuitry (sometimes called a chipset) that interconnects and controls communications between system components. The user device 112 typically includes a user interface 510. The user interface 510 typically includes one or more output devices 512 such as an audio output device 514, such as speakers 516 or an audio output connection (e.g., audio jack) for connecting to speakers, earphones, or headphones. The user interface 510 also typically includes a display 511 (e.g., a screen or monitor). In some implementations, the user device 112 includes input devices 518 such as a keyboard, mouse, and/or other input buttons. Alternatively or in addition, in some implementations, the user device 112 includes a touch-sensitive surface. In some embodiments, the touch-sensitive surface is combined with the display 511, in which case the display 511 is a touch-sensitive display. In some implementations, the touch-sensitive surface is configured to detect various swipe gestures (e.g., continuous gestures in vertical and/or horizontal directions) and/or other gestures (e.g., single/double tap). In computing devices that have a touch-sensitive surface (e.g., a touch-sensitive display), a physical keyboard is optional (e.g., a soft keyboard may be displayed when keyboard entry is needed). Furthermore, user device 112 may also include a microphone and voice recognition software to supplement or replace the keyboard.

The memory 530 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. In some implementations, the memory 530 includes one or more storage devices remotely located from the processors 502. The memory 530, or alternatively the non-volatile memory devices within the memory 530, includes a non-transitory computer-readable storage medium. In some implementations, the memory 530 or the computer-readable storage medium of the memory 530 stores the following programs, modules, and data structures, or a subset or superset thereof:

- an operating system 532, which includes procedures for handling various basic system services and for performing hardware dependent tasks;
- a network communication module 534, which is used for connecting the user device 112 to other computers and devices via the one or more communication network interfaces 520 (wired or wireless), such as the internet, other wide area networks, local area networks, metropolitan area networks, and so on;
- a user interface module 536 for providing user interfaces for the user to interact with the user device 112 via applications on the user device 112 and the operating system 532 of the user device 112;
- an EVCS mobile application 538 for communicating with an EVCS 100 or a server system that supports the EVCS 100. In some embodiments, EVCS mobile application 538 is capable of displaying a map of nearby electric vehicle charging stations. As described below, in some embodiments, the map displays indications of nearby electric vehicle charging stations, in which the indications include representations of co-located retail outlets;
- a maps application 549 for providing turn-by-turn driving directions to a user;
- a web browser application 550 for accessing the internet and accessing websites on the internet, including providing functionalities on the EVCS mobile application 538 via a website accessed through web browser application 550; and
- other applications 552 that the user 114 may have installed on the user device 112 or that may have been included as default applications on the user device 112.

Each of the above identified executable modules, applications, or sets of procedures may be stored in one or more of the previously mentioned memory devices and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 530 stores a subset of the modules and data structures identified above. Furthermore, the memory 530 may store additional modules or data structures not described above.

Although FIG. 5 shows a user device 112, FIG. 5 is intended more as a functional description of the various features that may be present rather than as a structural schematic of the implementations described herein. In practice, and as recognized by those of ordinary skill in the art, items shown separately could be combined and some items could be separated.

Figure 6A:
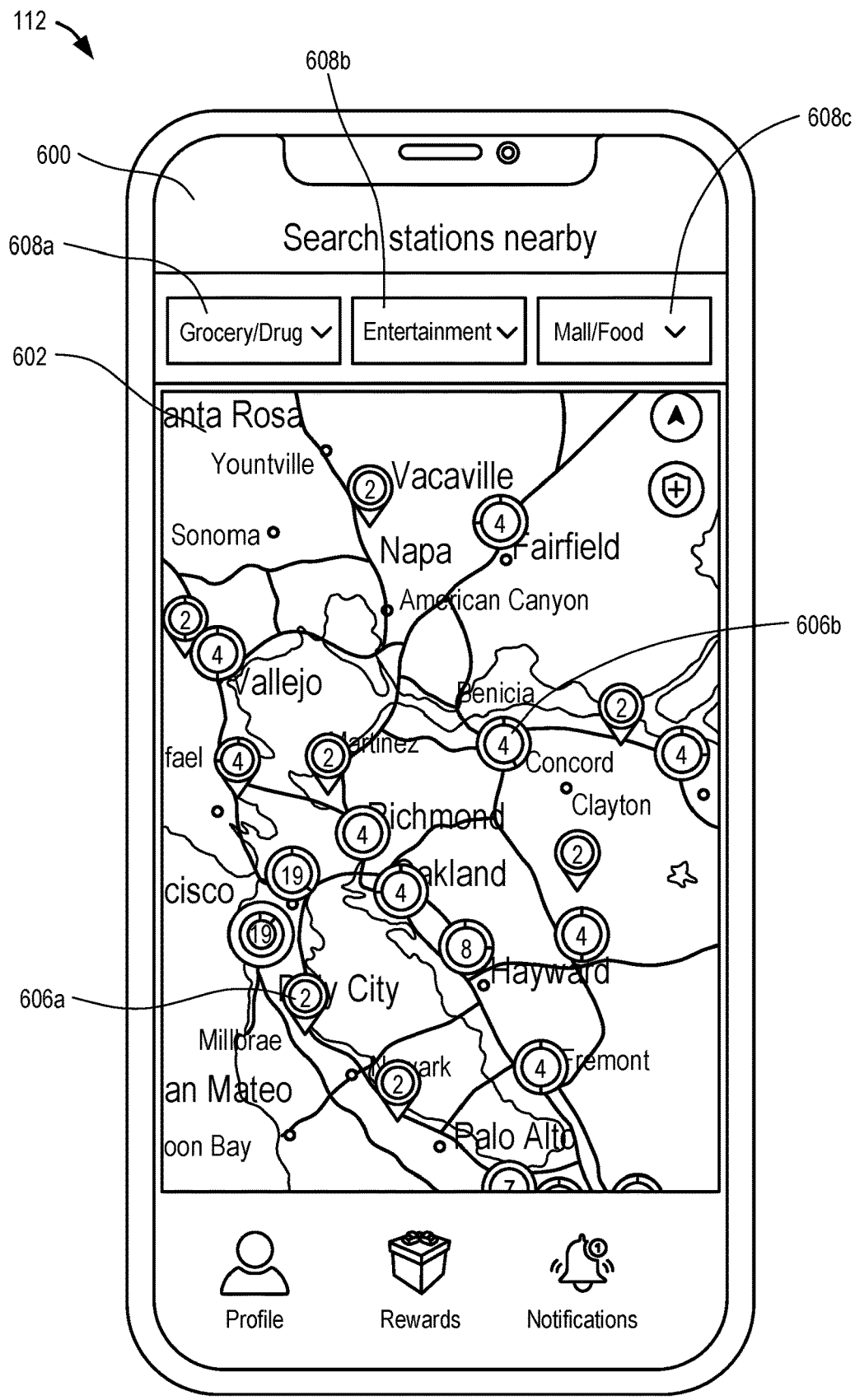
FIGS. 6A-6D illustrate different aspects of a user interface for an electric vehicle charging station mobile application, in accordance with some embodiments.

FIG. 6A illustrates a user interface 600 for an electric vehicle charging station mobile application 538, in accordance with some embodiments. Although FIG. 6A illustrates interface 600 as displayed on user device 112 (e.g., a portable multifunction device such as a smart phone), in some embodiments, user interface 600 is displayed on a display of a computer system integrated into electric vehicle 110. In some embodiments, the user interface 600 is displayed in response to receiving (e.g., detecting) a request from the user to display information about available charging stations (e.g., nearby charging stations).

User interface 600 includes a map 604 of a geographical region. Map 604 displays available charging stations for electric vehicles. In some embodiments, the geographical region is based on a geographic location of user device 112 (e.g., a GPS location of the user device 112). The map 604 includes indications 606 of groups of charging stations, which are overlaid on the map. The indications 606 of groups of charging stations indicate the number of charging stations in the group that are available for charging, as well as their location on the map 604. For example, indication 606a is represented as a pin on the map and indicates that the group has two charging stations available for charging, whereas indication 606b has fourteen charging stations available for charging. The charging stations within the groups of charging stations are co-located, meaning that the charging stations within each group meet predefined criteria for being co-located. For example, the predefined criteria may include a requirement that each charging station within the group be located within a predefined distance of one another or within available parking for a shopping center.

User interface 600 also allows the user to filter indications of nearby charging stations displayed on map 604 based on the types of retail outlets that are nearby the respective charging stations (or groups of charging stations). For example, user interface 600 includes three buttons 608 corresponding to different categories of retail outlet. Button 608a allows the user to filter indications 606 according to which groups of charging stations are co-located with grocery and/or drug stores, button 608b allows the user to filter indications 606 according to which groups of charging stations are co-located with entertainment, and button 608c allows the user to filter indications 606 according to which groups of charging stations are co-located with malls and/or food. Here, again, co-located means that the charging stations within the group meet predefined criteria with respect to their proximity to the retail outlet (e.g., that the charging stations are within a certain distance or within the available parking for the shopping center).

Figure 6B:
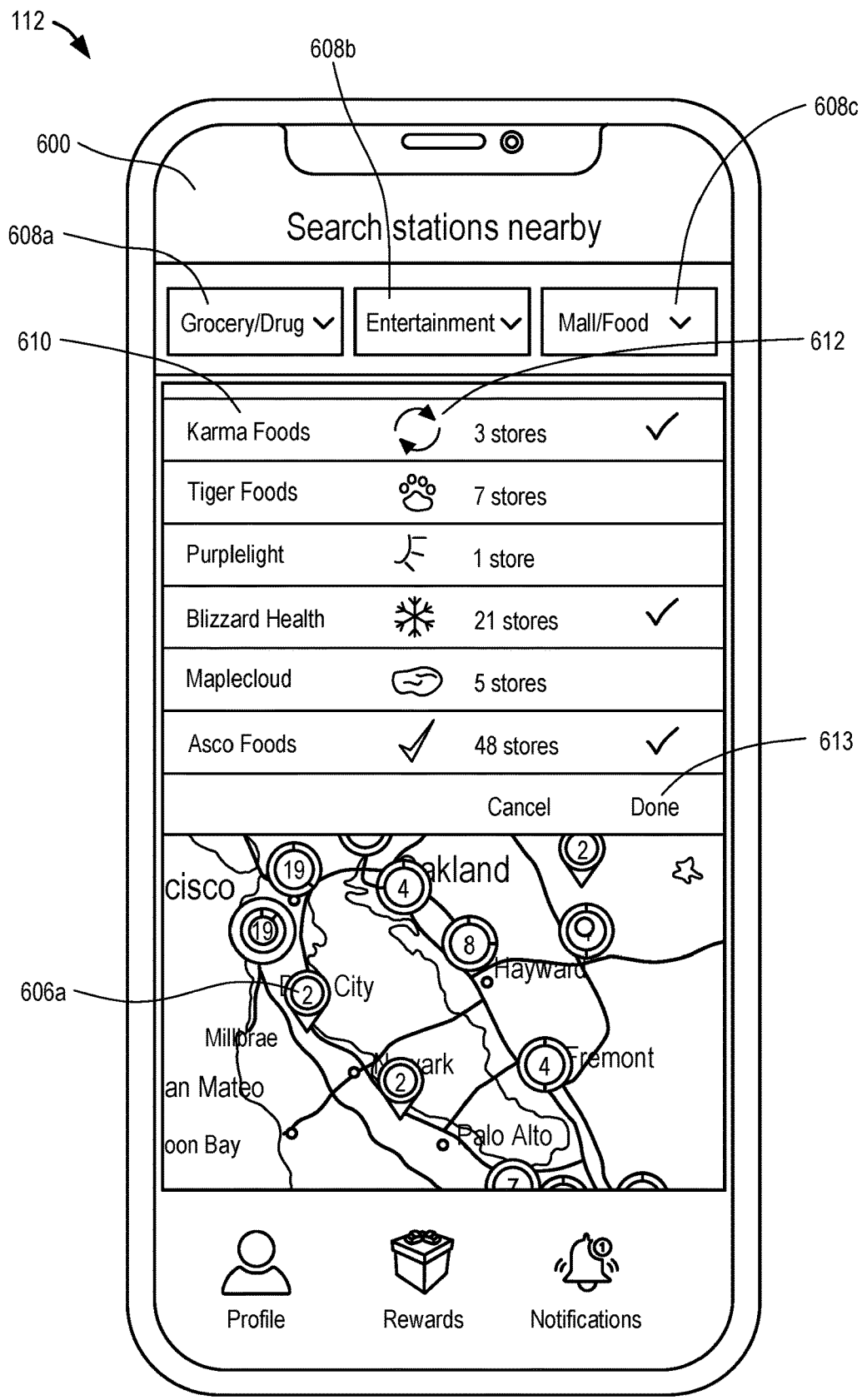
Figure 6C:
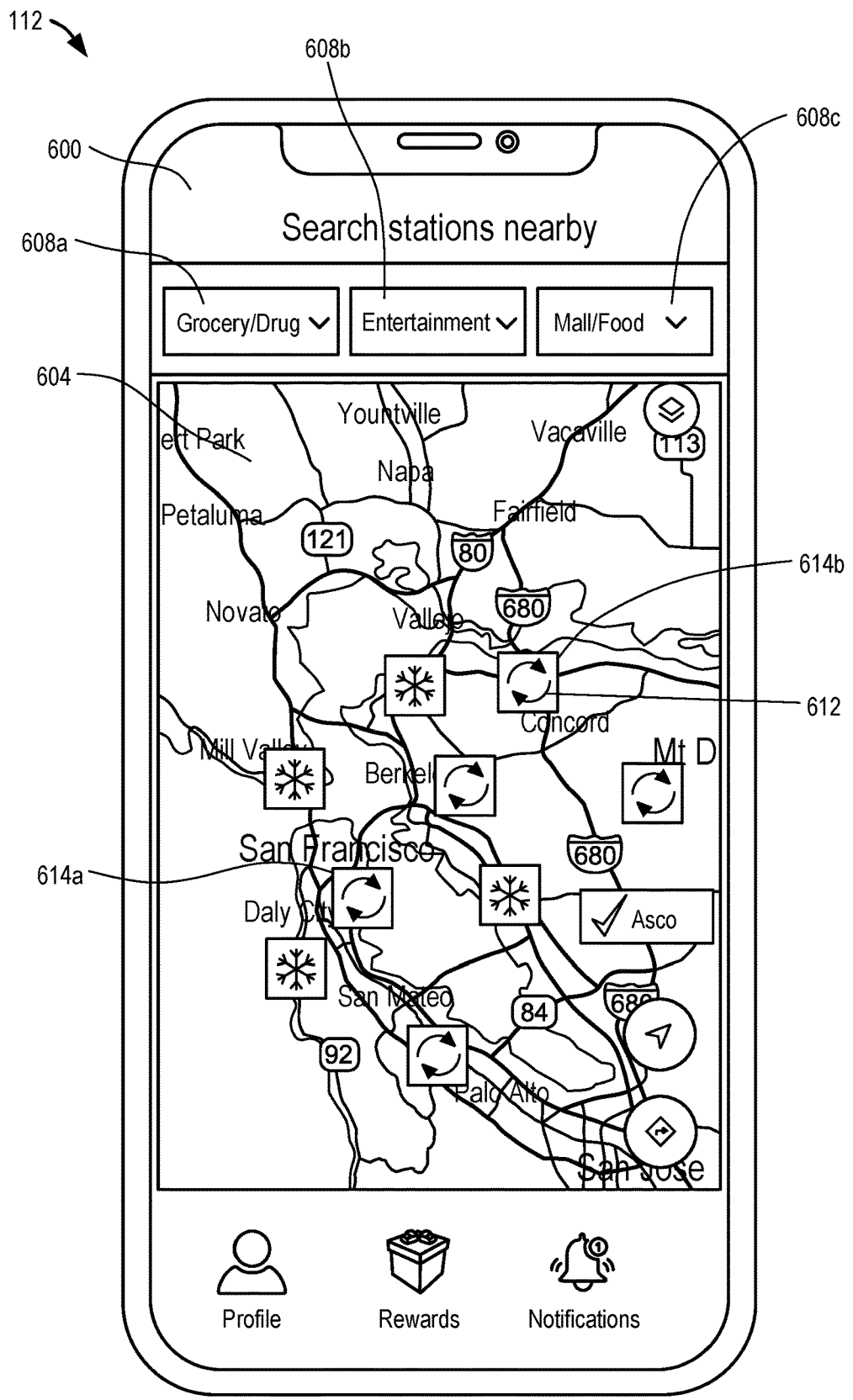

FIG. 6B illustrates user interface 600 in response to user selection of button 608a (e.g., in response to receiving a request from the user to filter the displayed charging stations according to which charging stations are co-located with grocery and/or drug stores). In response to user selection of button 608a, user interface 600 displays a drop-down menu 610. The drop-down menu 610 allows users to select individual retail outlets on which to filter the map 604 of charging stations. In other words, in response to the user selecting individual retail outlets (and pressing the "done" affordance 613), the indications 606 displayed on map 604 are filtered to show which charging stations (or groups of charging stations) are near the individual retail outlets selected by the user (e.g., as shown in FIG. 6C). In this example, the user has selected Karma Foods, Blizzard Health, and Asco Foods. A corresponding logo 612 is displayed for each retail outlet in the drop-down menu 610 (e.g., logo 612 for Karma foods).

FIG. 6C illustrates user interface 600 in response to the user selection of individual retail outlets shown in FIG. 6B. In FIG. 6C, map 604 shows indications 614 of electric vehicle charging stations. In some embodiments, the indications 614 correspond in a one-to-one manner to indications 606 (FIGS. 6A-6B). That is, indication 614a represents the same charging station or group of charging stations that is represented by indication 606a, and indication 614b represents the same charging station or group of charging stations that is represented by indication 606b. Rather than displaying the number of available charging stations, however, each indication 614 includes a representation (e.g., logo 612) of the retail outlet that is co-located with the charging station or group of charging stations.

Displaying a representation of retail outlets co-located with charging stations obviates the need for the user to search for retail outlets independently of searching for charging stations (e.g., in a separate maps application, such as maps application 549). Doing so not only saves time and provides convenience to the user, but also results in a more efficient machine-human interface. That is, displaying a representation of retail outlets co-located with charging stations reduces the number of inputs needed by the user to determine where to go and where to charge, which saves battery power for the electronic device 112 and reduces the mileage driven by the electric vehicle (e.g., by directing the user to charging stations that happen to be located where the user needs to go anyway). The latter effect saves battery power and reduces wear and tear on electric vehicles and has the general effect of being environmentally friendly by reducing the number of miles driven.

Figure 6D:
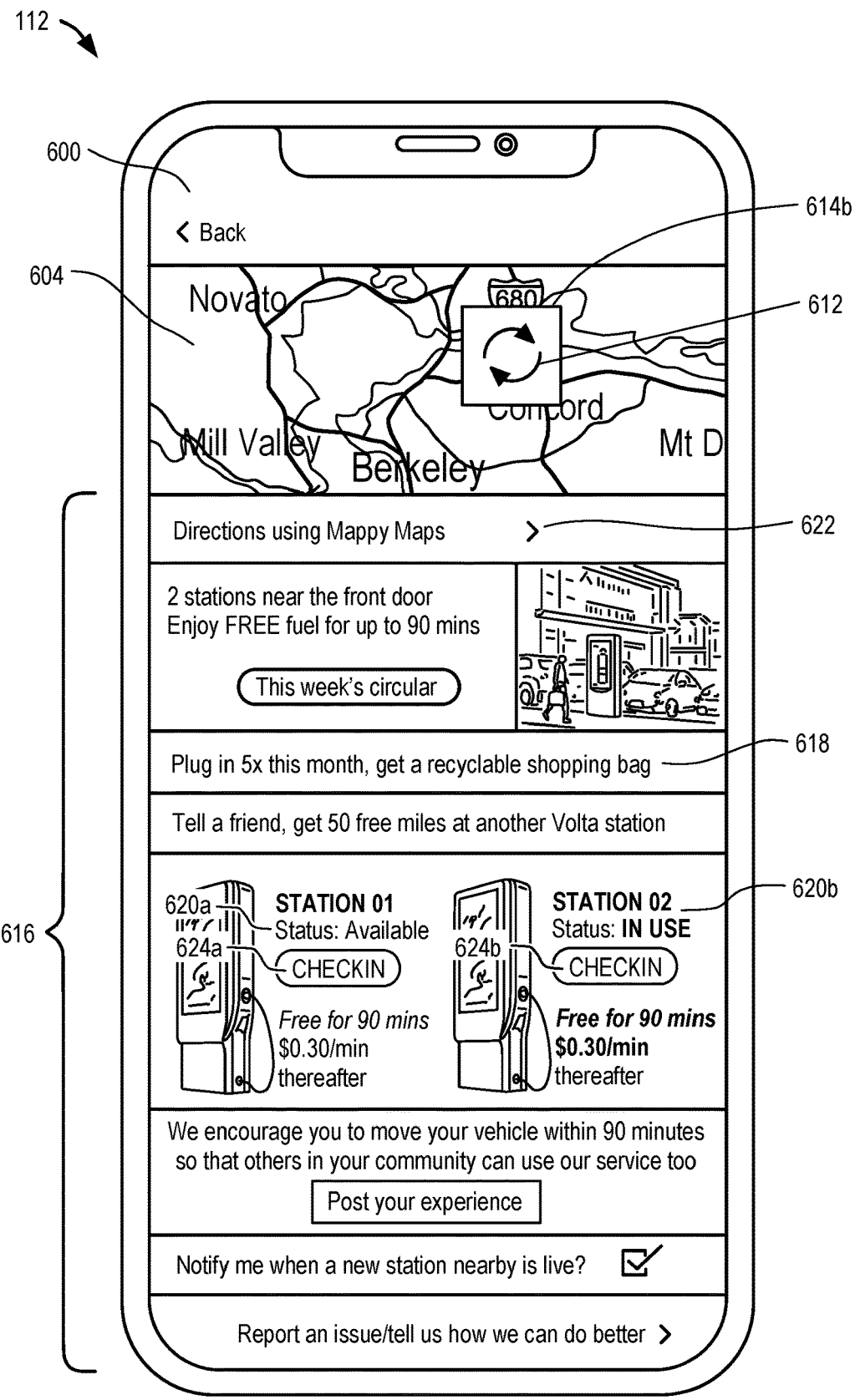

FIG. 6D illustrates user interface 600 in response to user selection of an indication 614b (FIG. 6C), which indicates that a group of charging stations is co-located with a Karma Foods store. User interface 600 displays a summary 616 of the charging stations or group of charging stations represented by indication 614b. The summary 616 includes a promotional offer 618 for Karma Foods (e.g., indicating that the user will get a recyclable shopping bag if they plug in at that location five times this month). In some embodiments, the promotional offer 618 indicates that the user will receive extended electric vehicle charging (e.g., extended free electric vehicle charging) if the user checks-in to the charging station and subsequently plugs into the charging station. The summary 616 also includes indications 620 of the availabilities of the charging stations at the location. For example, indication 620a shows that station 01 is available for charging. The user can check in to station 01 (using button 624a) and reserve the charging station for 90 minutes of free charging. In contrast, station 02 is in use, and thus button 624b is grayed out and not selectable by the user. The summary 616 also includes a photograph 626 of the retail outlet. A portion of the map 604 showing indication 614b remains displayed in user interface 600 simultaneously with summary 616. The summary 616 also includes a button 622 through which the user can request directions to the charging station indicated by indicator 614b (e.g., through a third-party maps application, such as maps application 549).

Figure 7A:
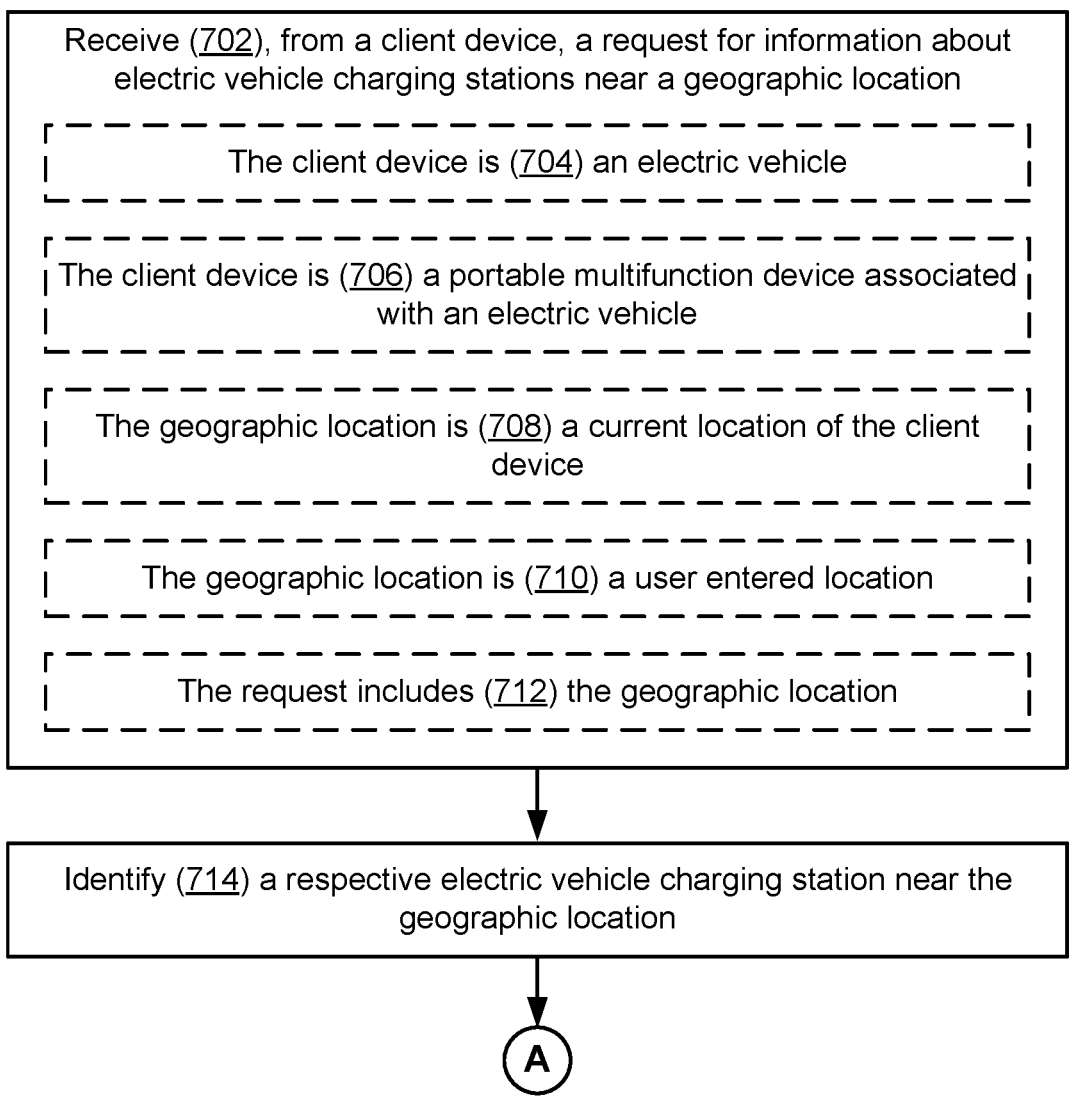
Figure 7B:
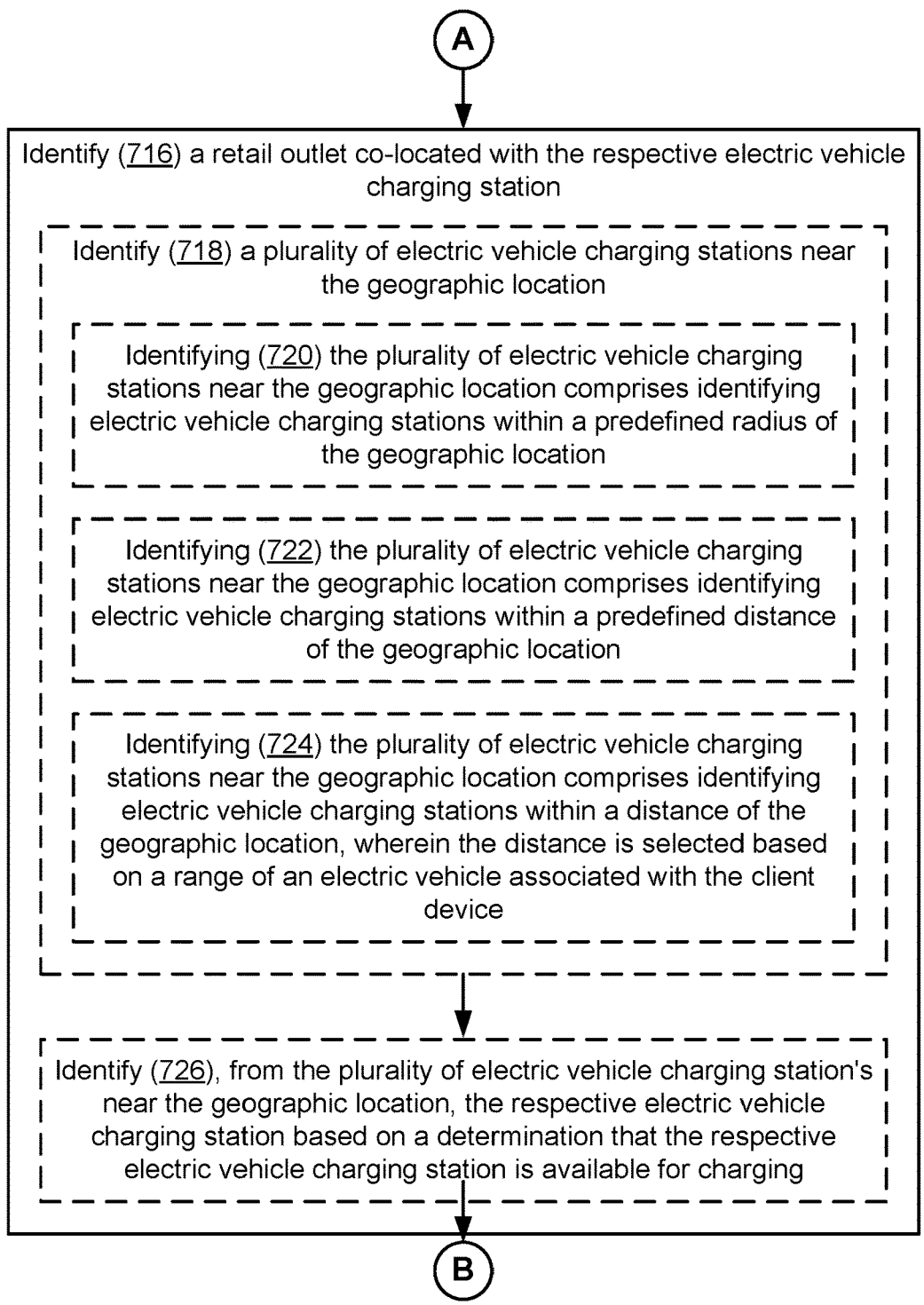

FIGS. 7A-7C illustrate a flowchart of a method 700 of providing indications of available electric vehicle charging stations with pertinent information about nearby retail outlets, in accordance with some implementations. The method 700 is performed at server system with one or more processors, and memory (e.g., server 120, FIG. 1). In some embodiments, method 700 shares any of the features or operations of method 800 (or includes corresponding server-side operations, whereas method 800 provides client-side operations). For brevity, these details are not repeated here.

The server system receives (702), from a client device, a request for information about electric vehicle charging stations near a geographic location.

In some embodiments, the client device is (704) an electric vehicle (e.g., a computer system of an electric vehicle). As used herein, an electric vehicle is considered any vehicle that is configured to receive a charge from an EVCS 100 (e.g., a fully electric vehicle and/or a plug-in hybrid).

In some embodiments, the client device is (706) a portable multifunction device (e.g., a smartphone, tablet, etc.) associated with an electric vehicle (e.g., having an EVCS mobile application that is logged into an account associated with the electric vehicle). In some embodiments, the request is sent from the client device, without user intervention, in response to the client device navigating to a particular user interface of an EVCS mobile application (e.g., user interface 600, FIGS. 6A-6B). That is, when the user requests a map of available electric vehicle charging stations, by navigating to a map page of the EVCS mobile application, the request is automatically sent.

In some embodiments, the geographic location is (708) a current location of the client device (e.g., a GPS location). In some embodiments, the geographic location is (710) a user entered location (e.g., an address entered by the user as text or through speech). In some embodiments, the request includes (712) the geographic location.

The server system identifies (714) a respective electric vehicle charging station near the geographic location. The server system identifies (716) a retail outlet co-located with the respective electric vehicle charging station. In some embodiments, operations 714 and 716 are performed together in response to the user requesting information on available electric vehicle charging stations that are co-located with particular retail outlets (e.g., Asco Foods) or particular categories of retail outlet (e.g., Grocery and/or Drug). For example, in some embodiments, operations 714 and 716 are performed in response to user selection of a respective button 608 (FIGS. 6A-6D), or in response to user selection of a particular retail outlet from drop-down menu 610.

In some embodiments, method 700 may be applied to commercial enterprises that are not retail outlets. For example, in some embodiments, method 700 may be applied to entities or facilities of commerce such as ski resorts, ice skating rinks, movie theaters, non-profit centers (e.g., museums), and others. For simplicity, method 700 is described with respect to retail outlets. In some embodiments, method 700 may be applied to points of interest (POIs) that are not commercial in nature.

In some embodiments, the server system identifies (718) a plurality of electric vehicle charging stations near the geographic location. In some embodiments, identifying (720) the plurality of electric vehicle charging stations near the geographic location comprises identifying electric vehicle charging stations within a predefined radius of the geographic location (e.g., 10, 20, 50 miles). In some embodiments, identifying (722) the plurality of electric vehicle charging stations near the geographic location comprises identifying electric vehicle charging stations within a predefined distance (e.g., driving distance) of the geographic location (e.g., 10, 20, 50 miles). In some embodiments, identifying (724) the plurality of electric vehicle charging stations near the geographic location comprises identifying electric vehicle charging stations within a distance of the geographic location, wherein the distance is selected based on a range of an electric vehicle associated with the client device (e.g., 50%, 75% of the remaining range of the electric vehicle). In some embodiments, identifying the plurality of electric vehicle charging stations near the client device's geographic location includes looking up, in a database (e.g., database 338), electric vehicle charging stations that are near the client device's geographic location.

In some embodiments, the server system identifies (726), from the plurality of electric vehicle charging stations near the geographic location, the respective electric vehicle charging station based on a determination that the respective electric vehicle charging station is available for charging.

The server system transmits (728) instructions, to the client device, to display an indication of the respective electric vehicle charging station (e.g., indication 614b, FIG. 6C-6D). The indication of the respective electric vehicle charging station includes a representation of the retail outlet co-located with the respective electric vehicle charging station. Displaying an indication of a charging station together with a representation of a retail outlet that is co-located with the respective charging station improves conventional methods for conveying information about available electric vehicle charging stations by allowing users to more efficiently couple electric vehicle charging to the needs of their excursion. Doing so saves battery and processing power of the user's electronic devices by obviating the need for multiple searches, and also saves battery power and wear and tear on electric vehicles by promoting efficient routing.

In some embodiments, the indication is (730) displayed as an overlay on a map.

In some embodiments, the indication of the respective electric vehicle charging station represents (732) a group of electric vehicle charging stations that are co-located with the retail outlet (e.g., indication 614b represents a group of fourteen charging stations). Displaying indications of available charging stations as an overlay on a map, together with representations of co-located retail outlets, allows users to more efficiently plan excursions, which saves battery power and wear and tear on electric vehicles.

In some embodiments, the representation of the retail outlet co-located with the respective electric vehicle charging station is (734) a logo for the retail outlet (e.g., logo 612, FIG. 6C-6D).

In some embodiments, the indication of the respective electric vehicle charging station that includes the representation of the retail outlet co-located with the respective electric vehicle charging station is a second indication of the respective electric vehicle charging station. Prior to transmitting the instructions to the client device to display the second indication, the server system transmits instructions, to the client device, to display a first indication of the respective electric vehicle charging station (e.g., indication 606b, FIG. 6A-6B), wherein the first indication does not include the representation of the retail outlet co-located with the respective electric vehicle charging station. The server system receives one or more user inputs, including user selection of retail outlet criteria. In response to receiving the one or more user inputs: the server system identifies the retail outlet co-located with the respective electric vehicle charging station and transmits instructions, to the client device, to display the second indication of the respective electric vehicle charging station.

In some embodiments, the first indication of the respective electric vehicle charging station represents a group of charging stations and includes an indication of a number of charging stations in the group (e.g., indication 606b indicates that fourteen charging stations are available for charging).

In some embodiments, the indication of the number of charging stations in the group is an indication of a number of available charging stations in the group.

In some embodiments, the one or more user inputs include a user selection of a category of retail outlet, and the retail outlet is identified in accordance with the user selection of the category of retail outlet (e.g., the user selection of a button 608 or a particular retail outlet from drop-down menu 610, described above). In some embodiments, the one or more user inputs comprise a request to filter the indications (e.g., first indications) of plurality of available charging stations displayed on the map according to a particular retailer or category of retail outlet (e.g., to display indications of a subset, less than all, of the plurality of available charging stations that were initially displayed). Allowing users to filter a map of available electric vehicle charging stations by retail outlet or category of retail outlet promotes efficient routing of excursions, saves battery power and reduces wear and tear on electric vehicles.

In some embodiments, the server system receives (736), from the client device, user selection of the indication of the respective electric vehicle charging station that includes the representation of the retail outlet co-located with the respective electric vehicle charging station. In response to receiving the user selection of the indication of the respective electric vehicle charging station, the server system displays (738) a summary of the respective electric vehicle charging station (e.g., summary 616, FIG. 6D).

In some embodiments, the summary includes (740) a promotional offer for the retail outlet. In some embodiments, the promotional offer includes (742) extended electric vehicle charging. In some embodiments, the summary includes (744) an indication of availability of the respective electric vehicle charging station. In some embodiments, the summary includes indications of availability of nearby charging stations. In some embodiments, the summary includes an affordance (e.g., button) that allows a user to check in to a charging station (e.g., reserve the charging station for 90 minutes).

In some embodiments, the summary includes an affordance for requesting directions to the charging station or group of charging stations. In some embodiments, the affordance navigates the user to a third-party maps application.

Figure 8:
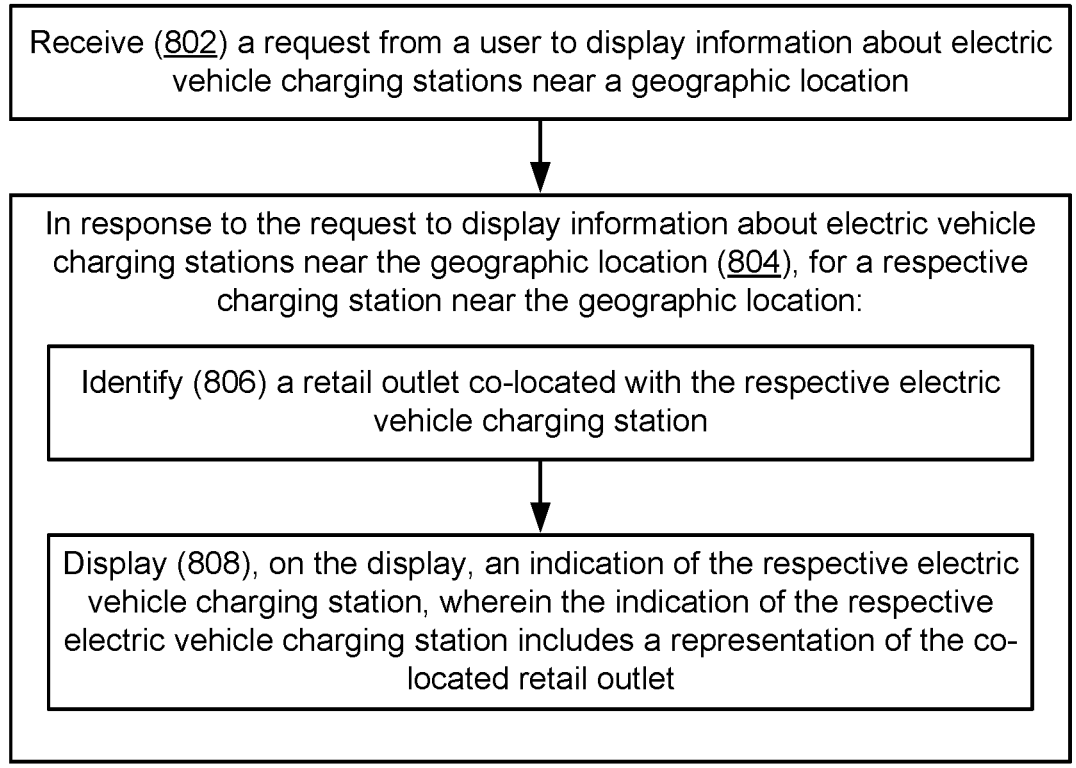
FIG. 8 illustrates a flowchart of another method of providing indications of available electric vehicle charging stations with pertinent information about nearby retail outlets, in accordance with some implementations.

FIG. 8 illustrates a flowchart of a method 800 of providing indications of available electric vehicle charging stations with pertinent information about nearby retail outlets, in accordance with some implementations. The method 800 is performed at an electronic device with a display, one or more processors and memory. In some embodiments, the electronic device is a client device (e.g., user device 112, such as a portable multifunction device, or electric vehicle 110). In some embodiments, method 800 shares any of the features or operations of method 700 (or includes corresponding client-side operations, whereas method 700 provides server-side operations). For brevity, these details are not repeated here.

The electronic device receives (802) a request from a user to display information about electric vehicle charging stations near a geographic location. For example, the user may launch a user interface of an EVCS mobile application, where the user interface displays a map of nearby available charging stations for electric vehicles.

In response to the request to display information about electric vehicle charging stations near the geographic location, for a respective charging station near the geographic location (804), the electronic device: identifies (808) a retail outlet co-located with the respective electric vehicle charging station and displays (810), on the display, an indication of the respective electric vehicle charging station. The indication of the respective electric vehicle charging station includes a representation of the co-located retail outlet. In some embodiments, identifying the retail outlet comprises communicating with a server system (e.g., as described in method 700), which performs a look-up and transmits instructions back to the client device. The indication of the respective available charging station for electric vehicles includes a representation of the co-located retail outlet. For example, the indication of the respective available charging station may be a pin that includes a logo of the co-located retail outlet. Note that the pin may represent a group of charging stations. Note, further, that the indication that includes the representation of the co-located retail outlet may be a second indication, displayed in response to a user request to filter first indications of available charging stations according to co-located retail outlets or co-located retail outlet categories (as described elsewhere in this document).

Displaying an indication of an available charging station together with a representation of a retail outlet that is co-located with the respective charging station improves conventional methods for conveying information about available electric vehicle charging stations by allowing users to more efficiently couple electric vehicle charging to the needs of their excursion. Doing so saves battery and processing power of the user's electronic devices by obviating the need for multiple searches, and also saves battery power and wear and tear on electric vehicles by promoting efficient routing.

Figure 9:
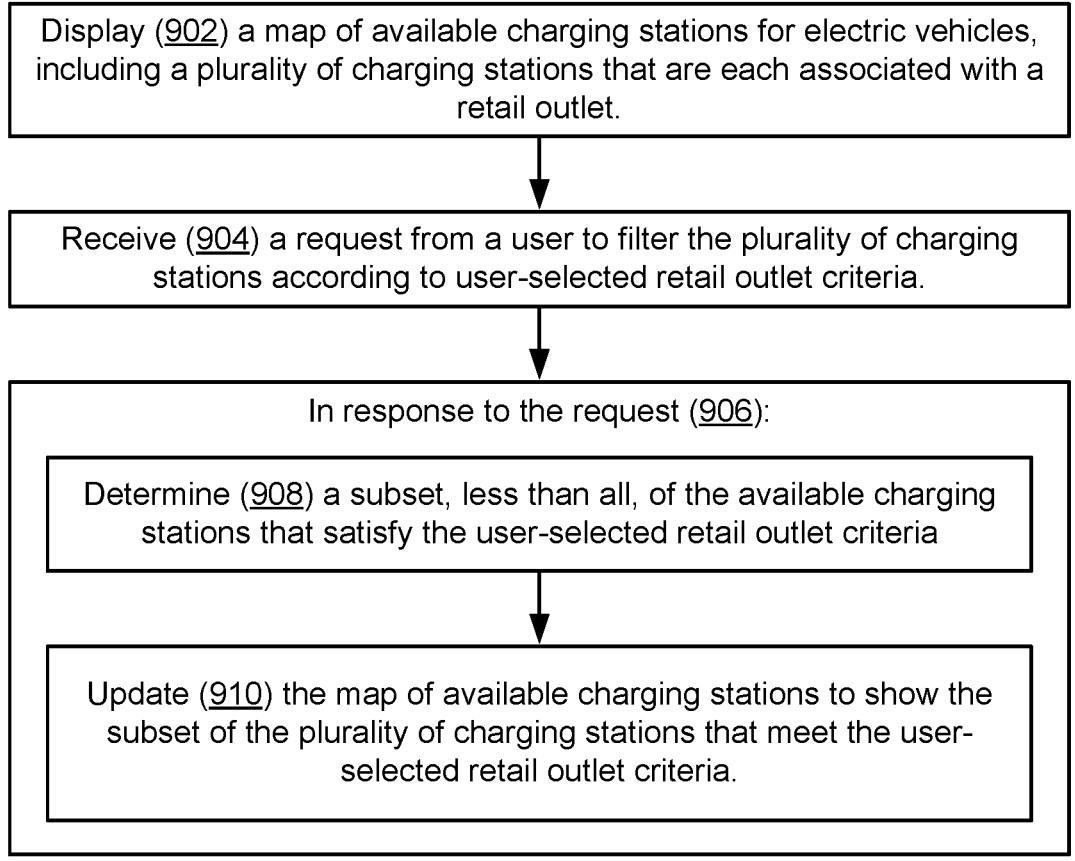
FIG. 9 illustrates a flowchart of another method of providing indications of available electric vehicle charging stations with pertinent information about nearby retail outlets, in accordance with some implementations.

FIG. 9 illustrate a flowchart of a method 900 of providing indications of available electric vehicle charging stations with pertinent information about nearby retail outlets, in accordance with some implementations. The method 900 is performed at an electronic device with a display, one or more processors and memory. In some embodiments, the electronic device is a client device (e.g., user device 112, such as a portable multifunction device, or electric vehicle 110). In some embodiments, method 900 shares any of the features or operations of method 700 (or includes corresponding client-side operations, whereas method 700 provides server-side operations). For brevity, these details are not repeated here.

The electronic device displays (902) a map of available charging stations for electric vehicles, including a plurality of charging stations that are each associated with a retail outlet (e.g., indications 606, FIGS. 6A-6B). The electronic device receives (904) a request from a user to filter the plurality of charging stations according to user-selected retail outlet criteria (e.g., according to a particular retail outlet or a category of retail outlet). In response to the request (906) the server system: determines (908) a subset, less than all, of the available charging stations that satisfy the user-selected retail outlet criteria (e.g., by communicating with a server system, which returns the results) and updates (910) the map of available charging stations to show the subset of the plurality of charging stations that meet the user-selected retail outlet criteria (e.g., map 604 shown in FIG. 6C is an updated version of map 604 shown in FIG. 6A).

Allowing users to filter a map of available electric vehicle charging stations by retail outlet or category of retail outlet promotes efficient routing of excursions, saves battery power and reduces wear and tear on electric vehicles.

It will be understood that, although the terms first, second, etc., are, in some instances, used herein to describe various elements, these elements should not be limited by these terms. These terms are only used to distinguish one element from another. For example, a first widget could be termed a second widget, and, similarly, a second widget could be termed a first widget, without departing from the scope of the various described implementations. The first widget and the second widget are both widget, but they are not the same condition unless explicitly stated as such.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method, comprising:
at a server system with one or more processors and memory:
receiving, from a client device, a request for information about electric vehicle charging stations near a geographic location;
identifying a respective electric vehicle charging station near the geographic location;
identifying a commercial enterprise based on a location of the respective electric vehicle charging station;
transmitting instructions, to the client device, to display an indication of the respective electric vehicle charging station, wherein the indication of the respective electric vehicle charging station includes a representation of the commercial enterprise identified based on the location of the respective electric vehicle charging station;
receiving, from the client device, user selection of the indication of the respective electric vehicle charging station that includes the representation of the commercial enterprise selected based on the location of the respective electric vehicle charging station; and
in response to receiving the user selection of the indication of the respective electric vehicle charging station, displaying a summary of the respective electric vehicle charging station.

2. The method of claim 1, comprising:
identifying a plurality of electric vehicle charging stations near the geographic location; and
identifying, from the plurality of electric vehicle charging stations near the geographic location, the respective electric vehicle charging station based on a determination that the respective electric vehicle charging station is available for charging.

3. The method of claim 2, wherein:
the indication of the respective electric vehicle charging station that includes the representation of the commercial enterprise identified based on the location of the respective electric vehicle charging station is a second indication of the respective electric vehicle charging station, and
the method comprises, prior to transmitting the instructions to the client device to display the second indication:
transmitting instructions, to the client device, to display a first indication of the respective electric vehicle charging station, wherein the first indication does not include the representation of the commercial enterprise identified based on the location of the respective electric vehicle charging station;
receiving one or more user inputs, including user selection of commercial enterprise criteria; and
in response to receiving the one or more user inputs:
identifying the commercial enterprise identified based on the location of the respective electric vehicle charging station; and
transmitting instructions, to the client device, to display the second indication of the respective electric vehicle charging station.

4. The method of claim 3, wherein the first indication of the respective electric vehicle charging station represents a group of electric vehicle charging stations and includes an indication of a number of electric vehicle charging stations in the group.

5. The method of claim 4, wherein the indication of the number of electric vehicle charging stations in the group is an indication of a number of available electric vehicle charging stations in the group.

6. The method of claim 3, wherein:
the one or more user inputs include a user selection of a category of commercial enterprise, and
the commercial enterprise is identified in accordance with the user selection of the category of commercial enterprise.

7. The method of claim 2, wherein identifying the plurality of electric vehicle charging stations near the geographic location comprises identifying electric vehicle charging stations within a predefined radius of the geographic location.

8. The method of claim 2, wherein identifying the plurality of electric vehicle charging stations near the geographic location comprises identifying electric vehicle charging stations within a predefined distance of the geographic location.

9. The method of claim 2, wherein identifying the plurality of electric vehicle charging stations near the geographic location comprises identifying electric vehicle charging stations within a distance of the geographic location, wherein the distance is selected based on a range of an electric vehicle associated with the client device.

10. The method of claim 1 wherein the summary includes a promotional offer for the commercial enterprise.

11. The method of claim 10, wherein the promotional offer includes extended electric vehicle charging.

12. The method of claim 1 wherein the summary includes an indication of availability of the respective electric vehicle charging station.

13. The method of claim 1 wherein the summary includes indications of availability of nearby electric vehicle charging stations.

14. The method of claim 1, wherein the client device is an electric vehicle.

15. The method of claim 1, wherein the client device is a portable multifunction device associated with an electric vehicle.

16. The method of claim 1, wherein the indication is displayed as an overlay on a map.

17. The method of claim 1, wherein the representation of the commercial enterprise identified based on the location of the respective electric vehicle charging station is a logo for the commercial enterprise.

18. The method of claim 1, wherein the geographic location is a current location of the client device.

19. The method of claim 1, wherein the geographic location is a user entered location.

20. The method of claim 1, wherein the request includes the geographic location.

21. The method of claim 1, wherein the indication of the respective electric vehicle charging station represents a group of electric vehicle charging stations.

22. A server system, comprising:
one or more processors; and
memory storing one or more programs for execution by the one or more processors, the one or more programs including instructions for:
receiving, from a client device, a request for information about electric vehicle charging stations near a geographic location;
identifying a respective electric vehicle charging station near the geographic location;
identifying a commercial enterprise based on a location of the respective electric vehicle charging station;

transmitting instructions, to the client device, to display an indication of the respective electric vehicle charging station, wherein the indication of the respective electric vehicle charging station includes a representation of the commercial enterprise identified based on the location of the respective electric vehicle charging station;

receiving, from the client device, user selection of the indication of the respective electric vehicle charging station that includes the representation of the commercial enterprise selected based on the location of the respective electric vehicle charging station; and in response to receiving the user selection of the indication of the respective electric vehicle charging station, displaying a summary of the respective electric vehicle charging station.

23. A non-transitory computer-readable storage medium comprising one or more programs, the one or more programs including instructions, which, when executed by a server system with one or more processors, cause the server system to perform a set of operations, comprising:

receiving, from a client device, a request for information about electric vehicle charging stations near a geographic location;

identifying a respective electric vehicle charging station near the geographic location;

identifying a commercial enterprise based on a location of the respective electric vehicle charging station;

transmitting instructions, to the client device, to display an indication of the respective electric vehicle charging station, wherein the indication of the respective electric vehicle charging station includes a representation of the commercial enterprise identified based on the location of the respective electric vehicle charging station;

receiving, from the client device, user selection of the indication of the respective electric vehicle charging station that includes the representation of the commercial enterprise selected based on the location of the respective electric vehicle charging station; and in response to receiving the user selection of the indication of the respective electric vehicle charging station, displaying a summary of the respective electric vehicle charging station.

* * * * *